United States Patent [19]

Hashimoto

[11] Patent Number: 4,958,724

[45] Date of Patent: Sep. 25, 1990

[54] TUBULAR BELT CONVEYOR

[75] Inventor: Kunio Hashimoto, Kitakyushu, Japan

[73] Assignee: Kabushiki Kaisha Nihon Pipe Conveyor, Kitakyushu, Japan

[21] Appl. No.: 355,662

[22] Filed: May 23, 1989

[30] Foreign Application Priority Data

May 24, 1988 [JP] Japan .................................. 63-124991

[51] Int. Cl.$^5$ ............................................. B65G 15/08
[52] U.S. Cl. .................................... 198/819; 198/840
[58] Field of Search ................................ 198/819, 840

[56] References Cited

U.S. PATENT DOCUMENTS

| 4,402,395 | 9/1973 | Hashimoto | 198/819 |
| 4,585,118 | 4/1986 | Plaut | 198/840 |

FOREIGN PATENT DOCUMENTS

| 943817 | 6/1956 | Fed. Rep. of Germany | 198/819 |
| 948676 | 9/1956 | Fed. Rep. of Germany | 198/840 |

Primary Examiner—Joseph E. Valenza
Attorney, Agent, or Firm—Marvin H. Kleinberg

[57] ABSTRACT

A tubular belt conveyor for carrying granulated materials, materials, etc., in which an endless belt is rolled up into a tube thereby to carry the materials in a wrapped condition is guided through a plurality of belt-retaining rollers mounted to each of supporting frames disposed along the length of the endless belt. The plurality of belt-retaining rollers includes a smooth rollers and at least one circumferentially multi-grooved friction roller at a position of greatest pressure contact with the belt, thereby preventing the belt from being twisted during the operation. The high friction roller is generally positioned at the bottom of the loaded belt in regions of no path direction changes but may be positioned at the top on an unladen belt, or at a point intermediate the top and bottom where the belt undergoes directional changes and the resultant force is directed other than straight down.

8 Claims, 6 Drawing Sheets

TUBULAR BELT CONVEYOR

BACKGROUND OF THE INVENTION

This invention relates to a tubular belt conveyor wherein the circulating belt is rolled up into a tube, and materials, loaded on the belt are transferred while being wrapped, and in particular, to a tubular belt conveyor which is designed to prevent the belt from being twisted during travelling between a pair of rollers.

There is conventionally known a tubular belt conveyor which is adapted to transfer granulated materials or bulk materials in the open air. One example is disclosed in my earlier Pat. No. 4,402,395. The tubular belt conveyor is so designed that an endless belt except for both end portions thereof is rolled up into a tube so as to carry the granulated materials or bulk materials in a wrapped state in order to prevent these loaded materials from getting wet in the rain, being blown away or falling out of the belt.

Figure 8:
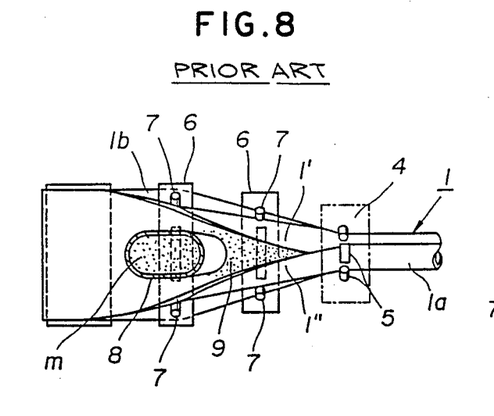
FIG. 8 is a plan view of the loading site of the conventional tubular conveyor.
Figure 9:
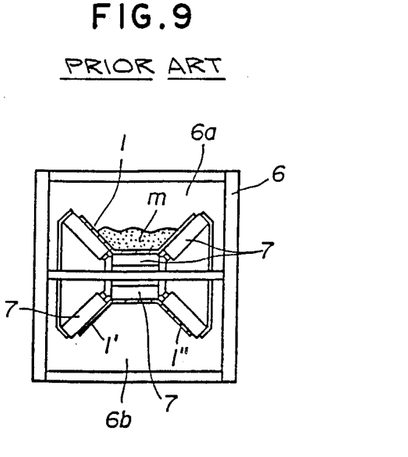
FIG. 9 is a vertically sectioned front view of the conveyor frame 6 of FIG. 8.
Figure 10:
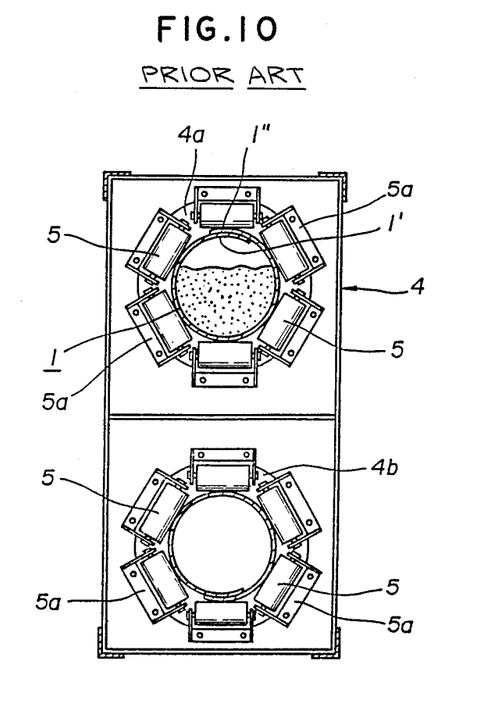
FIG. 10 is a front view of the supporting frame 4.

FIGS. 7 to 10 illustrate an example of such a conventional tubular belt conveyor as mentioned above. Reference numeral 1 shows an endless belt made, for example, of rubber. This endless belt 1 is so manufactured in advance that, when released, it will spontaneously roll up into a tube due to its elasticity with both fringe portion 1, and 1" being overlapped one upon another. However, portions of the endless belt each engaging with the upper driving roller 2 and the lower driven roller 3 are unfolded flat. Other portions of the endless belt 1 which are rolled up into a tube are sustained by a number of supporting frames 4 disposed at a predetermined interval (1 m to 2 m). Each of the supporting frames 4 is provided, as shown in FIG. 10 in the upper and lower portions thereof, with an upper belt passageway 4a and a lower belt passageway 4b, and also with a plurality of belt-retaining rollers 5 circumferentially disposed at regular intervals around each of the belt passageways 4a and 4b. Each of the belt-retaining rollers 5 is fixed to the supporting frames 4 through a bracket 5a.

At the forward side of the driven roller 3 as well as the backward side of the driving roller 2 are disposed, as shown in FIGS. 8 & 9, a plurality of curling-extending frames 6 for rolling or unfolding the endless belt 1 in stepwise fashion. Each of the supporting frames 6 is provided in the upper and lower portions thereof with an upper belt passageway 6a and a lower belt passageway 6b, and also with a plurality of belt-deforming rollers 7 disposed in each of the belt passageways 6a and 6b in such a manner that the plurality of belt-deforming rollers 7 form a segmental circular shape. In this case, a pair of the belt-deforming rollers 7 disposed at both sides of the belt passageways 6a and 6b are so adjusted in mounting angle that those disposed in the supporting frame 6 nearer to the driven roller 3 (or driving roller 2) are less inclined.

The forward-moving belt 1a which is once unfolded flat upon turning around the lower driven roller 3 is gradually rolled up to be finally formed into a tubular shape due to the elastic tendency to restore its original tubular shape, and also due to the presence of plural sets of the deforming rollers 7, each arranged to form a segmental circular shape.

Figure 7:
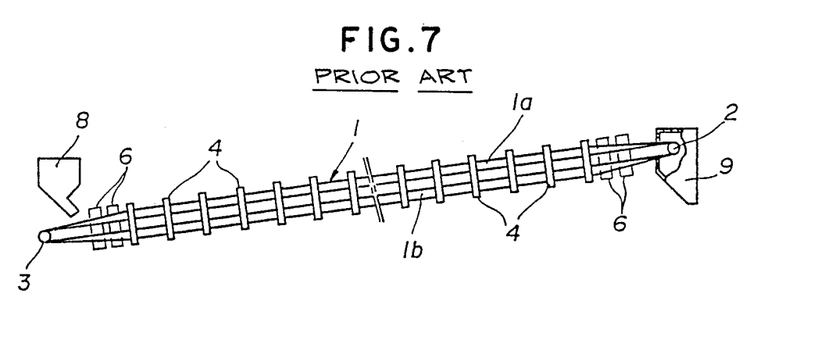
FIG. 7 is a side view of a conventional tubular conveyor.

While the belt 1a is being rolled up as mentioned above, materials "m" to be conveyed are dropped onto the belt 1a from a hopper 8 and wrapped by the belt 1a. The belt 1a, now formed into a tubular shape with both fringe portions 1, and 1" thereof being overlapped one upon the other, passes through the upper passageway 4a of each supporting frame 4. Upon passing through the last supporting frame 4 which is located at the most forward site, the belt 1a is gradually unfolded flat by the upper deforming rollers 7 mounted on the rolling-unfolding frame 6 disposed near the driving roll 2, and turned around the driving roller 2, thereby dropping the material "m" loaded on the belt 1a into a receiving cylinder 9.

Then, the forward-moving belt 1a is turned into a backward-moving belt 1b which is again gradually rolled up by passing through the lower deforming rollers 7 mounted on the rolling-unfolding frame 6. Upon passing through a sequence of the lower passageways 4b of supporting frames 4, the belt 1b is again unfolded flat in front of the driven roller 3 by the lower deforming rollers 7 of the rolling-unfolding frames 6 disposed near the driven roller 3, and then turned around the driven roller 3 to repeat the forward movement as described above.

Meanwhile, it is frequently required to install a tubular belt conveyor having a length of as long as several hundred meters or more from a loading site to an unloading site, with the line of the tubular belt conveyor being bent upward, downward, leftward or rightward in accordance with the features of topography. Under these conditions, the running tubular belt is liable to be twisted around its axis 10 due to the following reasons: (i) A difference in contacting condition of the tubular belt to a retaining roller between that disposed at the inner circumference and that at the outer circumference at a curved portion of the tubular belt; (ii) A difference in frictional resistance of the tubular belt to the retaining rollers mounted on each of the supporting frames due to the characteristics or uneven distribution of materials carried on the pipe-like belt, or due to an uneven physical feature of the belt; and (iii) A slipping between the retaining rollers and the belt due to an adhesion of water to the rollers or the belt. As a result, the loaded materials are more likely to fall out, or the flattened portions of the belt engaging with the driving roller 2 or driven roller 3 are more likely to be dislocated relative to these rollers 2 and 3, thereby inhibiting these rollers from normally rotating.

In order to correct these malfunctions of the tubular belt conveyor, it is necessary to stop the operation of the conveyor in order to adjust the belt, or to incline either some of the retaining rollers mounted on the supporting frame or a roller disposed separate from the retaining rollers relative to the axis of the tubular belt thereby to adjust the belt (for example, Japanese unexamined patent disclosure No. 57-137206). However, these countermeasures are nothing but a sort of symptomatic therapy. Moreover, these adjusting operations, which are conducted whenever the twisting of the belt occurs, are not only troublesome, but also ineffective in coping with a long length of three-dimensionally curved tubular belt.

SUMMARY OF THE INVENTION

Accordingly, an object of this invention is to provide a tubular belt conveyor which can be operated under a constant predetermined belt posture without permitting the twisting of the belt to occur, even if the belt is very long and curved in any direction, i.e. up and down, or left and right.

According to a first feature of this invention, there is provided a tubular belt conveyor comprising and endless belt and plurality of supporting frames mounted at predetermined intervals along the length of the endless belt for guiding the endless belt, each of the supporting frames being provided in the upper and lower portions thereof with an upper belt passageway and a lower belt passageway respectively, and with a plurality of belt-retaining rollers circumferentially disposed around each of the belt passage ways to allow the endless belt to roll up like a pipe to wrap and convey a loaded material.

Said plurality of belt-retaining rollers include a circumferentially multi-grooved friction roller disposed at least at a position which takes the maximum load among them.

According to a second feature of this invention, there is provided a tubular belt conveyor wherein the above-mentioned circumferentially multi-grooved friction roller(s) is (are) disposed at a section of the upper belt passageway of each of the supporting frames which is to be pressure-contacted with the endless belt rolled up into a tubular shape.

According to a third feature of this invention, there is provided a tubular belt conveyor wherein the above-mentioned circumferentially multi-grooved friction roller is of a hand drum-like shape.

DESCRIPTION OF THE PREFERRED EMBODIMENTS

Figures 1, 2:
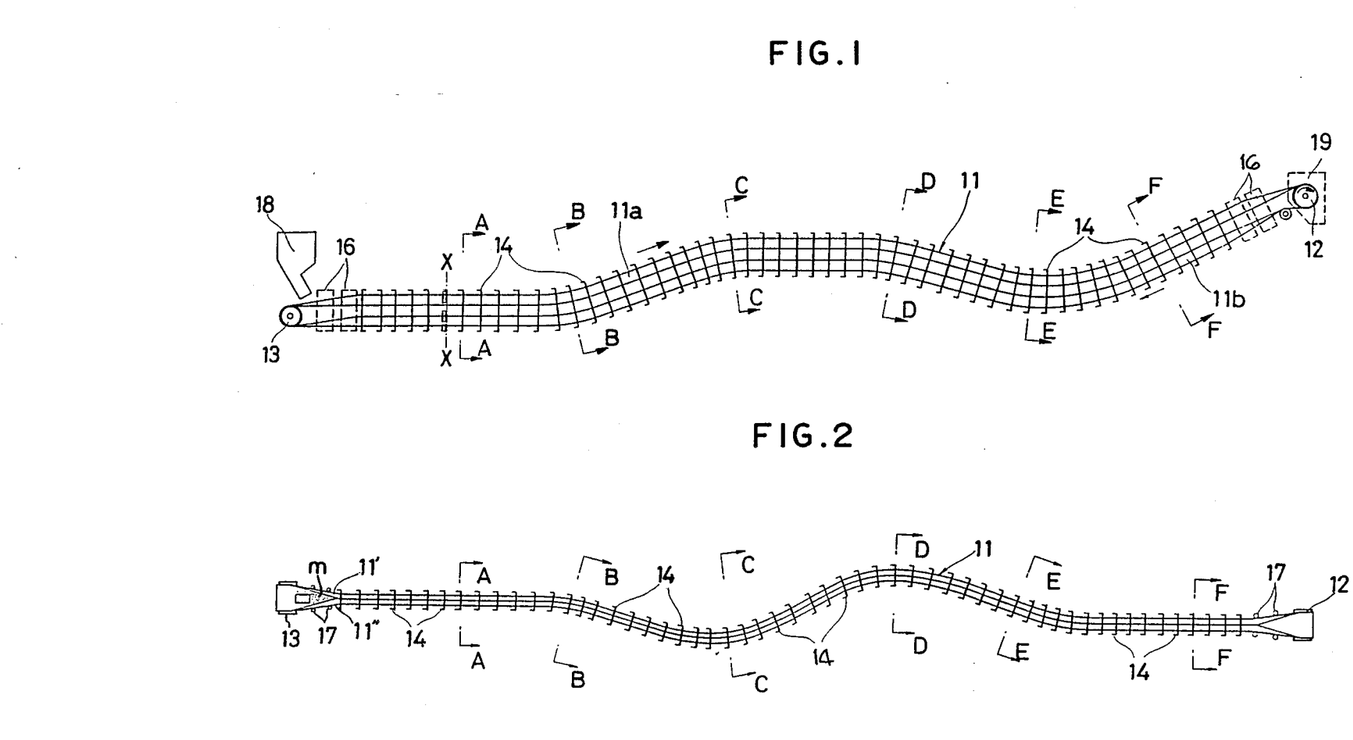
FIG. 1 shows a side view of a tubular belt conveyor according to one embodiment of this invention.
FIG. 2 shows a plan view of the tubular belt conveyor illustrated in FIG. 1.

FIG. 1 shows a side view of a tubular belt conveyor according to one embodiment of this invention, and FIG. 2 shows a plan view of the tubular belt conveyor shown in Fig. 1. As illustrated in FIGS. 1 and 2, a flexible endless belt 11 (forward-moving belt 11a and backward-moving belt 11b) includes, along the whole length thereof, portions indicated as "A" and "F" which are located respectively near the turning end portions of the endless belt and disposed in a straight line in both side and plan views; a portion indicated as "B" which is curved upward in side view and curved rightward (based on the traveling direction of the belt, hereinafter the same) in plan view; a portion indicated as "C" which is curved downward in side view and curved leftward in plan view; a portion indicated as "D" which is curved downward in side view and curved rightward in plan view; and a portion indicated as "E" which is curved upward in side view and curved leftward in plan view.

Figure 3:
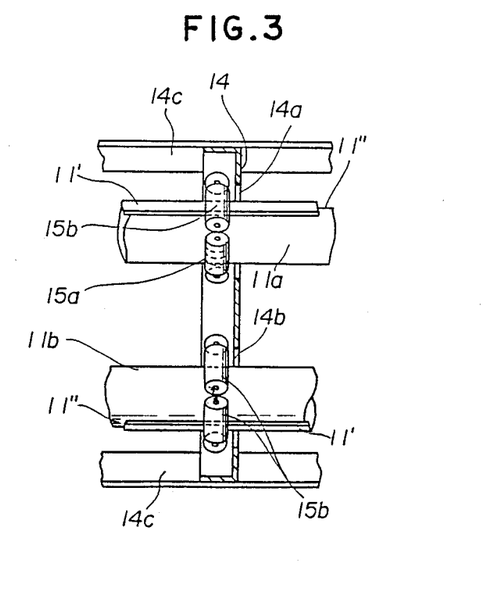
FIG. 3 shows a partially cut side view of the tubular belt conveyor taken along the line X—X in FIG. 1.

The endless belt 11 is suspended between a driving roller 12 and a driven roller 13, i.e. one end portion of the endless belt 11 is extended flat and engaged around the driven roller 13, and the other end portion of the endless belt 11 is also extended flat and engaged around the driving roller 12. The middle portion of the endless belt 11 is rolled up into a tube and supported by a plurality of supporting frames 14 disposed at regular intervals. As shown in FIGS. 3 and 4, these supporting frames 14 are respectively provided, at the upper and lower portions thereof, with an upper belt passageway 14a and a lower belt passageway 14b. Around each of these belt passageways 14a and 14b is disposed, as hereinafter explained, several belt-retaining rollers 15a and 15b in such a manner that each set of the retaining rollers 15a and 15b substantially forms a circular shape with each of the retaining rollers 15a (or 15b) being disposed apart from the others at a regular interval. Each of these retaining rollers 15a and 15b is fixed to the supporting frame 14 through a bracket (not shown). These supporting frames 14 are connected with each other by means of elongated corner bars 14c.

At the forward side of the driven roller 13 as well as the backward side of the driving roller 12 are disposed a plurality of rolling-unfolding frames 16 for rolling up or unfolding the endless belt 11 in steps. Each of the supporting frames 16 is substantially similar to the frames 6 of FIG. 9 and, like frames 6, each is provided, in the upper and lower portions thereof, with an upper belt passageway and a lower belt passageway respectively, and also with a plurality of belt-deforming rollers 17 similar to the rollers 7 disposed in each of upper and lower belt passageways in such a manner that the plurality of the belt-deforming rollers 17 form a segmental circular shape. In this case, a pair of the belt-deforming rollers 17 disposed at both sides of a series of the belt passageways are so adjusted in mounting angle that those disposed in the supporting frame 16 nearer to the driven roller 13 (or driving roller 12) are less inclined.

The endless belt 11, engaged with and suspended between the driving roller 12 and the driven roller 13 is turned into a forward-moving belt 11a upon being turned around over the driven roller 13 and receives materials "m" to be conveyed from a hopper 18. Then, the belt 11a is rolled up like a tube (as seen in FIG. 4) with both fringe portions 11, and 11" thereof being overlapped one upon the other by passing through the upper passageways of a plurality of rolling-unfolding frames 16. This tubular belt 11a then passes through a sequence of a number of the upper passageways 14a of the supporting frames 14 and upon passing through the upper deforming rollers 17 of the rolling-unfolding frames 16 disposed near the driving roller 12 is unfolded flat by the deforming rollers 17. Then, the belt 11a is turned around the driving roller 12, thereby, dropping the material "m" into a receiving cylinder 19, and moves backward as a backward-moving belt 11b. During this backward movement of the belt 11b, the overlapped portion of the belt 11b faces downward. In this state, the belt 11b passes through the rolling-unfolding frame 16 disposed at the driving roller side, each of the supporting frames 14 and the lower passageway of the rolling-unfolding frame 16 disposed at the driven roller side to be turned around over the driven roller 13 to repeat the circulating movement.

Figure 4A:
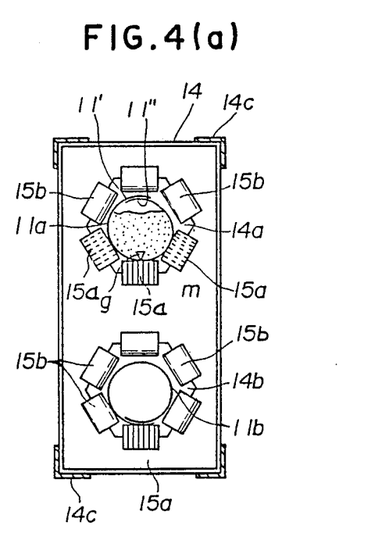
FIGS. 4(a) to 4(e) respectively show front views of belt-retaining rollers each taken along lines A–E respectively in the direction of the appended arrows, illustrating the belt-retaining state at several portions of the tubular belt conveyor with the view at F—F being the same as at A

In this case, at the portions of the conveyor marked A—A and F—F wherein the belt 11 is disposed straight in both side and plan views, the tubular forward-moving belt 11a does not shift either leftward or rightward, but moves forward while pressure-contacting at the bottom portion as well as at the both lower sides thereof with a horizontal bottom retaining roller 15a and with both lower side retaining rollers 15a of the upper passageway 14a of the supporting frame 14 as shown in FIG. 4a.

Figure 5A:
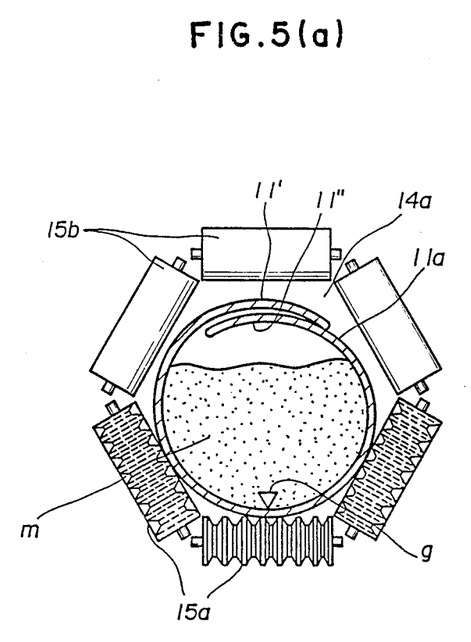
FIG. 5(a) is an enlarged front view of the forward-moving belt passageway shown in FIG. 4(a)
Figure 5B:
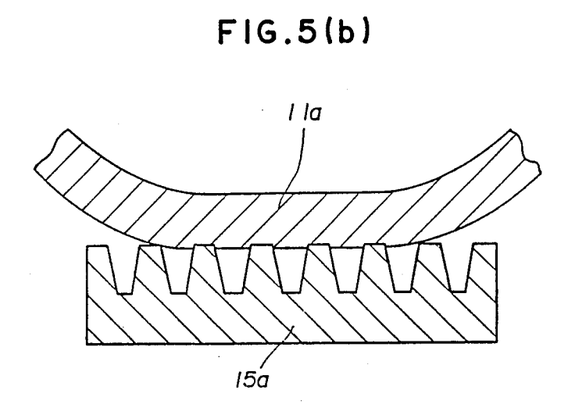
FIG. 5(b) is an enlarged sectional view illustrating a status of the grooved roller engaging with the belt.

Therefore, the horizontal bottom retaining roller 15a as well as a pair of lower side retaining rollers 15a are a circumferentially multi-grooved friction roller 15a which is made of a frictional material such as rubber (hereinafter referred to as grooved retaining roller) as shown in greater detail in FIG. 5(a). Other retaining rollers 15b have a smooth surface. With this construction, the rugged surface of the grooved retaining roller 15a sticks into the flexible forward-moving belt 11a as shown in FIG. 5(b), thereby increasing the frictional resistance between them and effectively preventing the tubular forward-moving belt from rotating around the axis thereof. Prevention of twisting of the forward-moving belt around its axis may also be effected by disposing the rubbery, grooved retaining roller 15a only at the horizontal bottom portion of the upper belt passageway 14a on which most of the loaded materials bear, without employing the rubbery grooved retaining rollers 15a at the lower sides of the upper belt passageway 14a.

Meanwhile, at the portion A—A and F—F, the backward-moving belt 11b is unloaded (freed from loaded materials). Therefore, all of the retaining rollers around the lower passageway 14b may be the smooth-surfaced rollers 15b. However, it may be desirable to utilize the grooved retaining roller 15a at the bottom horizontal portion on which the deadweight of the belt 11b rests, for completely preventing the belt 11b from being twisted.

Figure 4B:
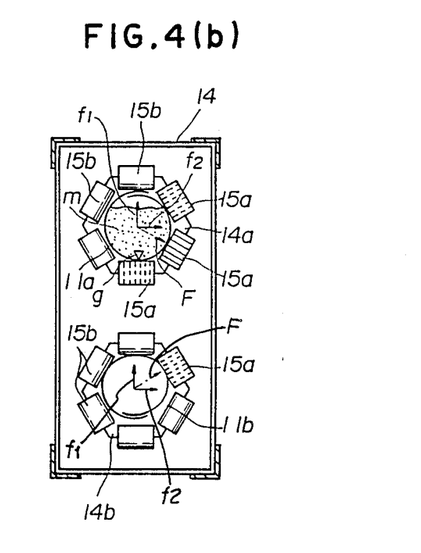

At the portion B—B where the belt is curved upward as well as rightward, in addition to the gravity "g" of the material "m", a force $f_1$ is directed toward the inner circumference of the curved portion due to the tensile force for straightening out the belt, i.e. an upward force $f_1$, and a rightward force $f_2$ is also applied to the forward-moving belt 11a as shown in FIG. 4(b). In this case, if the upward force $f_1$ is less than the gravity "g", the forward-moving belt 11a is forced into pressure-contact with the bottom horizontal roller and the upper and lower inclined rollers disposed at the right side of the upper passageway 14a of the supporting frame 14. Therefore, the grooved retaining roller 15a may be employed for the bottom horizontal roller and for the upper and lower inclined rollers disposed at the right side. A smooth-surfaced roller 15b is employed for other portions of the upper passageway. With this construction, it is possible to effectively prevent the belt from rotating around its axis.

It may be also possible to prevent the belt from twisting by employing the grooved retaining roller 15a only for the lower inclined roller which is disposed at the right side, and receives a resultant force of the above three forces, the other rollers being smooth-surfaced.

In contrast to this, since the backward-moving belt 11b is unloaded, all of the rollers around the lower passageway 14b may be formed of the smooth-surfaced roller 15b. However, it may be desireable, for preventing the belt 11a from rotating around its axis, to employ the grooved retaining roller 15a for the right upper inclined roller on which a resultant force "f", resulting from upward force $f_1$ and rightward force $f_2$ due to the tensile force of the belt, is effected.

Figure 4C:
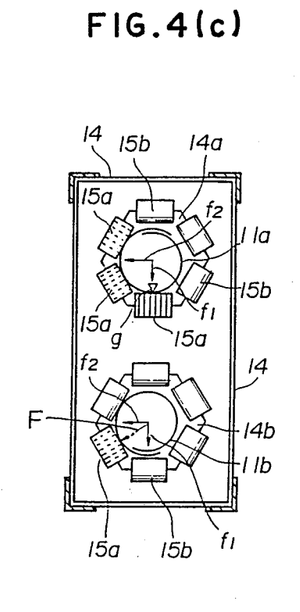

At the portion C—C where the belt is curved downward as well as leftward, the gravity "g" forces directed toward the inner circumference of the curved portion due to the tensile force of the belt, i.e. downward force $f_1$ and leftward force $f_2$ are directed to the forward-moving belt 11a as shown in FIG. 4(c). As a result, the forward-moving belt 11a is forced to pressure-contact with the bottom horizontal roller and the left upper and lower inclined rollers. Therefore, the grooved retaining roller 15a may be employed for the bottom horizontal roller and the left upper and lower inclined rollers, as well. The other rollers are smooth-surfaced rollers 15b, thereby preventing the belt from rotating around its axis.

In this case, it is also possible to employ the grooved retaining roller 15a only for the bottom horizontal roller to which the gravity "g" and the downward force $f_1$ are directed, the other rollers being the smooth-surfaced rollers.

On the other hand, with regard to the backward-moving belt 11b, each of the rollers around the lower passageway 14b may be the smooth-surfaced roller 15b. It may be desirable, for preventing the belt 11a from rotating around its axis, to employ the grooved retaining roller 15a for the left lower inclined roller to which a resultant force resulting from the forces $f_1$ and $f_2$ due to the tensile force of the belt is directed.

Figure 4D:
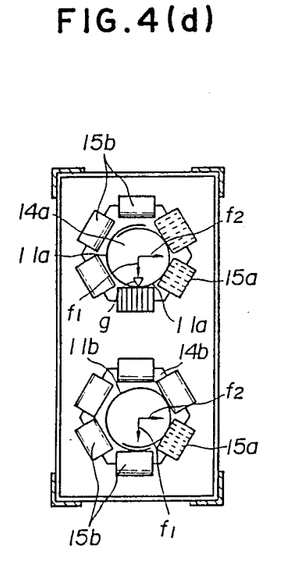
Figure 4E:
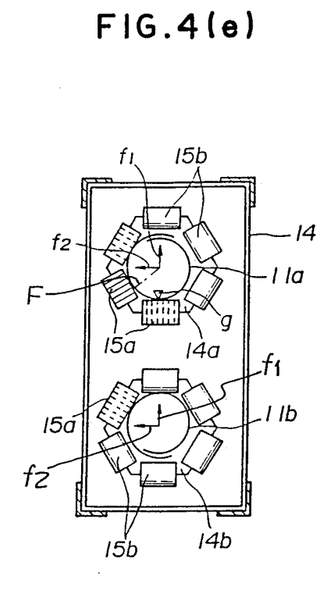

At the portion D—D, the forward-moving belt 11a is forced into pressure-contact with the bottom horizontal roller and the right upper and lower inclined rollers, and in particular the gravity "g" of the loaded materials and the downward force due to the tensile force of the belt is directed onto the bottom horizontal roller as shown in Fig. 4(d). On the other hand, at the portion E—E, the forward-moving belt 11a is forced into pressure-contact with the bottom horizontal roller and the left upper and lower inclined rollers, and, in particular, the gravity "g" and resultant force due to the tensile force of the belt is applied to the left lower inclined roller as shown in Fig. 4(e).

Accordingly, in both portions D—D and E—E, the grooved retaining roller 15a is employed for all of the rollers with which the tubular belt 11a is forced into pressure-contact, the other rollers being smooth-surfaced rollers.

It is also possible to employ the grooved retaining roller 15a only for the roller to which a larger load is directed, i.e. the bottom horizontal roller in the case of D—D, and the left lower inclined roller in the case of E—E, all other rollers being smooth-surfaced.

With regard to the backward-moving belt 11b, all of the retaining rollers may be smooth surfaced rollers as in the case of the other portions of the path. However, it may be desirable to employ the grooved retaining roller 15a for the roller located at a position around the lower passageway 14b where a resultant force resulting from a vertical force and a horizontal force due to the tensile force of the belt is directed, i.e. the right lower inclined roller in the case of portion D—D and the left upper inclined roller in the case of portion E—E.

Figure 6:
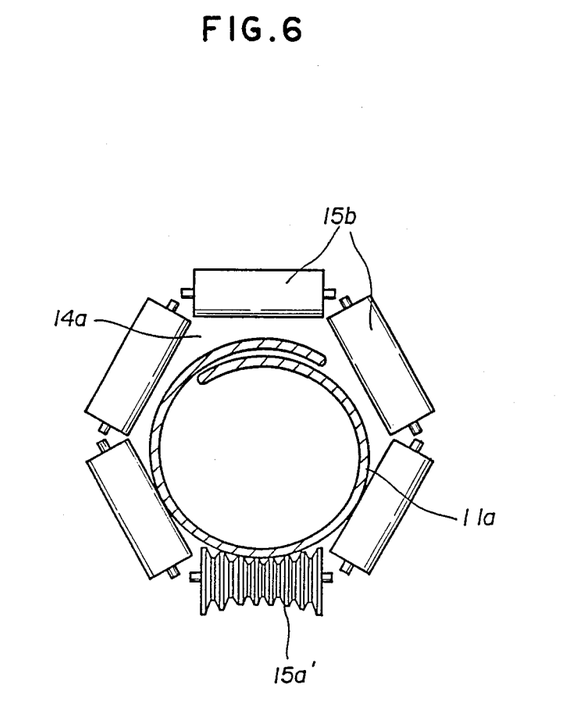
FIG. 6 is a front view of the belt passageway when a hand drum-like retaining roller is employed.

The shape of the circumferentially multi-grooved friction roller 15a is not confined to that explained in reference to the above example, but may be any suitably selected shape. For example, the friction roller 15a' may be formed into a hand drum-like shape, having a concave surface as shown in FIG. 6. With this hand drum-like roller, it is possible to induce a difference in circumferential velocity of the roller due to a difference in diameter between the central portion and side portions during the rotation of the roller caused by the travelling of the belt, thereby increasing the frictional resistance to the belt and to further promote the prevention of the twisting of the tubular belt.

As explained above, according to this invention, there is provided a tubular belt conveyor which is constructed of an endless belt and a plurality of supporting frames mounted at predetermined intervals along the length of the endless belt for guiding the endless belt, each of the supporting frames being provided in the upper and lower portions thereof with an upper belt passageway and a lower belt passageway respectively, and with a plurality of belt-retaining rollers circumferentially disposed around each of the belt passageways to allow the endless belt to roll up into a tube to wrap and convey loaded material; and which is characterized in that the plurality of the belt-retaining rollers include at least one circumferentially disposed multi-grooved friction roller at least at a position which takes the greatest load among the several rollers.

Therefore, the rugged surface of the multi-grooved friction roller is conveniently stuck into the surface of the tubular belt to keep constant the travelling state of the belt without permitting a rotation of the belt around its axis, even if the travelling line of the belt is curved or the loaded materials are dislocated, thereby dispensing with the conventional troublesome correcting work.

It is possible according this invention, to effectively prevent the belt from twisting by disposing a multi-grooved friction roller at every position of the belt passageway at which the tubular belt is to be pressure-contacted. Moreover, when the multi-grooved friction roller is shaped into a hand drum-like shape, it is possible to increase the frictional resistance between the belt and the rollers due to the varying diameter of the roller, thereby promoting the belt-retaining effect of the roller.

Therefore, this invention will be useful in promoting the essential function expected of the tubular belt conveyor.

WHAT IS CLAIMED AS NEW IS:

1. In a tubular belt conveyor having an endless belt and a plurality of supporting frame mounted at predetermined intervals along the length of the endless belt for guiding the endless belt along a prescribed path having changes of direction, each of the supporting frames being provided in the upper and lower portions thereof with an upper belt passageway and a lower belt passageway respectively, and with a plurality of smooth belt-retaining rollers circumferentially disposed around each of the belt passageways to allow the endless belt to roll up into a tube to wrap and convey a loaded material; the improvement comprising at least one supporting frame positioned along the path at a change of direction thereof having at least one grooved friction roller disposed at that circumferential position which takes a greater load resulting from the change in direction and the weight of the materials being conveyed than do the other belt retaining rollers within the supporting frame, whereby said grooved roller is located at a position other than the lowermost support position.

2. A tubular conveyor is defined in claim 1 wherein the upper passageway is used for the belt when loaded and wherein said grooved friction roller is circumferentially disposed at a section of the upper belt passageway which is to be pressure-contacted by the resultant forces upon the endless belt when rolled up into a tubular shape resulting from the combined tensile force of the change in direction and the weight of the conveyed materials.

3. A tubular belt conveyor as defined in claim 1 wherein said grooved friction roller having a concave shape complementing the tubular belt to increase the surface contact area at the point of maximum force due to the weight of the materials being conveyed and the tensile forces on the belt changing the direction thereof.

4. A tubular conveyor as defined in claim 1 wherein the lower passageway is used for the belt when unladen and wherein said grooved friction roller is circumferentially disposed at a section of the lower belt passageway which is to be pressure-contacted by the resultant forces upon the endless belt resulting from the combined tensile force of the change in direction and the weight of the belt.

5. A tubular belt conveyor system, including a plurality of supporting frames having a plurality of smooth guide rollers circumferentially arranged about the belt for guiding the belt along a predetermined path;
   at least one grooved roller highly resistant to lateral motion in the direction of the roller rotational axis, said grooved roller being in each of the supporting frames and positioned to support the belt at a region of greatest load,
   whereby said grooved roller is positioned at the bottom of the belt along that portion of the path without directional changes and at positions other than the bottom of the belt and at the area of greatest load resulting from the forces changing direction of the belt and the weight of the load being conveyed therein.

6. The tubular belt conveyor system of claim 5 above, further including additional grooved rollers positioned adjacent to and on either side of said grooved roller for providing additional support to the belt in the area of greatest load.

7. A method of stabilizing a tubular conveyor belt having a circumferential array of supporting rollers, which belt is following a path with directional changes, comprising the steps of:
   a. providing a plurality of supporting frames along the path of the conveyor belt, each frame including a plurality of smooth rollers circumferentially disposed around the tubular belts for the guidance and support thereof;
   b. providing at least one grooved high friction roller member in each frame that is highly resistant to motion parallel to the rotational axis of said roller;
   c. positioning said high friction roller to support the belt at the circumferential location of the area of greatest contact pressure resulting from the combination of the forces of gravity on the load being carried by the belt and the tensile forces changing the belt's direction of travel;
   whereby at points of unchanging path direction, said grooved roller members are positioned substantially at the lowest point of the belt and, at points of changing path direction, said grooved roller member is positioned at a resultant vector representing the combination of forces on the belt changing its direction and the weight of the load being conveyed, which position might be at locations around the belt other than the lowest point.

8. The method of claim 7, above, further including the steps of placing additional grooved rollers adjacent to and on either side of said grooved roller for further supporting the belt in the region of greatest load and to further resist rotation of the belt about the tubular axis.

* * * * *